United States Patent
Fujita et al.

(10) Patent No.: US 12,398,064 B2
(45) Date of Patent: *Aug. 26, 2025

(54) DECORATIVE GLASS ARTICLE

(71) Applicant: NIPPON ELECTRIC GLASS CO., LTD., Otsu (JP)

(72) Inventors: Naoki Fujita, Otsu (JP); Shinsaku Nishida, Otsu (JP)

(73) Assignee: NIPPON ELECTRIC GLASS CO., LTD., Otsu (JP)

( * ) Notice: Subject to any disclaimer, the term of this patent is extended or adjusted under 35 U.S.C. 154(b) by 992 days.

This patent is subject to a terminal disclaimer.

(21) Appl. No.: 17/598,490

(22) PCT Filed: Mar. 26, 2020

(86) PCT No.: PCT/JP2020/013756
§ 371 (c)(1),
(2) Date: Sep. 27, 2021

(87) PCT Pub. No.: WO2020/203673
PCT Pub. Date: Oct. 8, 2020

(65) Prior Publication Data
US 2022/0185722 A1    Jun. 16, 2022

(30) Foreign Application Priority Data
Apr. 5, 2019 (JP) ................................ 2019-072601

(51) Int. Cl.
*C03C 3/155* (2006.01)
*A44C 17/00* (2006.01)
*A44C 27/00* (2006.01)
*C03C 4/02* (2006.01)

(52) U.S. Cl.
CPC ............ *C03C 3/155* (2013.01); *A44C 17/008* (2013.01); *A44C 27/001* (2013.01); *C03C 4/02* (2013.01)

(58) Field of Classification Search
CPC ............ C03C 3/127; C03C 3/155; C03C 4/02
See application file for complete search history.

(56) References Cited

U.S. PATENT DOCUMENTS

| | | | |
|---|---|---|---|
| 5,270,269 A | 12/1993 | Hares et al. | |
| 5,612,102 A * | 3/1997 | Nakama | A44C 17/005 63/32 |
| 2007/0032367 A1 | 2/2007 | Sprachmann et al. | |
| 2014/0256531 A1 | 9/2014 | Endo et al. | |
| 2015/0203397 A1 | 7/2015 | Mikami et al. | |
| 2015/0218041 A1 | 8/2015 | Mikami et al. | |
| 2016/0113363 A1 | 4/2016 | Dymshits et al. | |
| 2016/0251257 A1 | 9/2016 | Mikami et al. | |
| 2019/0185369 A1 | 6/2019 | Inoue et al. | |
| 2022/0119302 A1 | 4/2022 | Inoue et al. | |
| 2022/0169558 A1 * | 6/2022 | Fujita | C03C 3/155 |
| 2023/0286854 A1 * | 9/2023 | Enomoto | C03C 3/125 |
| 2023/0286855 A1 * | 9/2023 | Enomoto | C03C 4/02 |

FOREIGN PATENT DOCUMENTS

| | | | |
|---|---|---|---|
| CN | 101817638 A | | 9/2010 |
| CN | 103663961 A | | 3/2014 |
| CN | 104926101 A | | 9/2015 |
| JP | S51-028071 A | | 3/1976 |
| JP | 2588468 B2 | | 3/1997 |
| JP | 2005-124687 A | | 5/2005 |
| JP | 2008-290317 A | | 12/2008 |
| JP | 4950876 B2 | | 6/2012 |
| JP | 2014-196236 A | | 10/2014 |
| JP | 2016-013971 A | | 1/2016 |
| JP | 2016079055 A | * | 5/2016 |
| JP | 2016-520503 A | | 7/2016 |
| JP | 2017-019696 A | | 1/2017 |
| JP | 2018-020934 A | | 2/2018 |
| JP | 2018-020935 A | | 2/2018 |
| WO | WO-2014/034623 A1 | | 3/2014 |
| WO | WO-2018-037797 A1 | | 3/2018 |

OTHER PUBLICATIONS

Japanese Office Action issued Feb. 14, 2024 in Application No. 2021-511940.
Japanese Office Action issued Jul. 17, 2024 in Application No. 2021-511940.
International Search Report dated June 9. 2020 for PCT/JP2020/013756 (with English translation).
Written Opinion dated June 9. 2020 for PCT/JP2020/013756.
Chinese Office Action issued Jan. 15, 2024 in Application No. 202080025096.0.
First Chinese Office Action issued Nov. 14, 2022 in Chinese Patent Application No. 202080025096.0.
Extended European Search Report issued Nov. 22, 2022 in EP Patent Application No. 20783386.4.
English translation of Written Opinion of the International Searching Authority mailed Jun. 9, 2020 for PCT/JP2020/013756.
Second Office Action issued Jun. 20, 2023 in Chinese Application No. 202080025096.0.

* cited by examiner

*Primary Examiner* — Elizabeth A. Bolden
(74) *Attorney, Agent, or Firm* — Faegre Drinker Biddle & Reath LLP

(57) ABSTRACT

A decorative glass article contains: in mol %, 10% to 70% of $La_2O_3$, 10% to 90% of $Nb_2O_5$, 0% to 40% of $B_2O_3$, and 0% to 50% of $TiO_2$, wherein a refractive index is 2.0 or more and an Abbe number is 50 or less.

12 Claims, 2 Drawing Sheets

Sample No. 10

Sample No. 11

Sample No. 12

Sample No. 13

DECORATIVE GLASS ARTICLE

TECHNICAL FIELD

The present invention relates to a decorative glass article suitable for decorative purposes, such as a ring, a pendant, an earring, or a bracelet.

BACKGROUND ART

According to GLASS MANUFACTURERS' ASSOCIATION OF JAPAN, a crystal glass is defined as "a glass containing lead oxide as a main component and a glass containing potassium oxide, barium oxide, titanium oxide, etc. as a main component, which is characterized by having high transparency, a refractive index nd of 1.52 or more, a beautiful brilliance and a clear tone". The crystal glass is excellent in brilliance, transparency, reverberation, profound feeling, processability, etc., and is used for decoration (jewelry, works of art, tableware, etc.).

However, since the lead-containing crystal glass is harmful to a human body and has a problem of being easily scratched, a lead-free crystal glass has been developed (Patent Literatures 1 and 2). In addition, in terms of a high refractive index, a high refractive index glass for optical glass containing a large amount of components such as $Bi_2O_3$ is known (Patent Literature 3).

CITATION LIST

Patent Literature

Patent Literature 1: Japanese Patent No. 2588468
Patent Literature 2: Japanese Patent No. 4950876
Patent Literature 3: JP-A-2016-13971

SUMMARY OF INVENTION

Technical Problem

The lead-free crystal glass has a low refractive index of about 1.57 and thus does not provide sufficient brilliance as a decoration. In addition, the dispersion thereof is also low, so that an iridescent brilliance called "fire" tends to be weak. On the other hand, the high refractive index glass for optical glass can achieve both a high refractive index and high dispersion, but there is a problem that the higher the refractive index, the stronger the coloring and the weaker the fire.

In view of the above, an object of the present invention is to provide a decorative glass article having a high refractive index and high dispersion and excellent in brilliance and fire.

Solution to Problem

A decorative glass article of the present invention contains: in mol %, 10% to 70% of $La_2O_3$, 10% to 90% of $Nb_2O_5$, 0% to 40% of $B_2O_3$, and 0% to 50% of $TiO_2$, wherein a refractive index is 2.0 or more and an Abbe number is 50 or less. Thus, with a glass composition containing $La_2O_3$ and $Nb_2O_5$ as essential components, it is possible to obtain a decorative glass article having a high refractive index and high dispersion and excellent in brilliance and fire. In addition, a glass having the glass composition also has a feature of easily being colorless and transparent.

The decorative glass article of the present invention preferably further contains, in mol %, 50% or more of $La_2O_3+Nb_2O_5$. Thus, it is easy to obtain optical properties such as a high refractive index and high dispersion. In this description, the expression "o+o+ . . . " means the total amount of the corresponding components.

The decorative glass article of the present invention preferably further contains, in mol %, 0.1% to 40% of $B_2O_3$. When $B_2O_3$ is contained as an essential component, vitrification is easy, so that a decorative glass article having a large size is easily obtained.

The decorative glass article of the present invention preferably has a degree of coloring $\lambda_5$ of 395 or less. Thus, visible light is easily transmitted, so that the decorative glass article tends to be colorless and transparent. The "degree of coloring $\lambda_5$" indicates the shortest wavelength (nm) at which the light transmittance is 5% in the transmittance curve at a thickness of 10 mm.

The decorative glass article of the present invention may further contains at least one selected from a transition metal oxide excluding $Nb_2O_5$ and $TiO_2$ and a rare earth oxide excluding $La_2O_3$ in an amount of more than 0% to 5% in mol %. Thus, a glass article having a desired color tone can be obtained depending on the components contained.

The decorative glass article of the present invention is preferably subjected to chamfering. Thus, light is easily reflected inside the glass article, and it is possible to enhance the brilliance.

The decorative glass article of the present invention is suitable as an artificial jewel.

A decoration of the present invention includes the above decorative glass article.

Advantageous Effects of Invention

According to the present invention, it is possible to provide a decorative glass article having a high refractive index and high dispersion and excellent in brilliance and fire.

DESCRIPTION OF EMBODIMENTS

Figure 1:
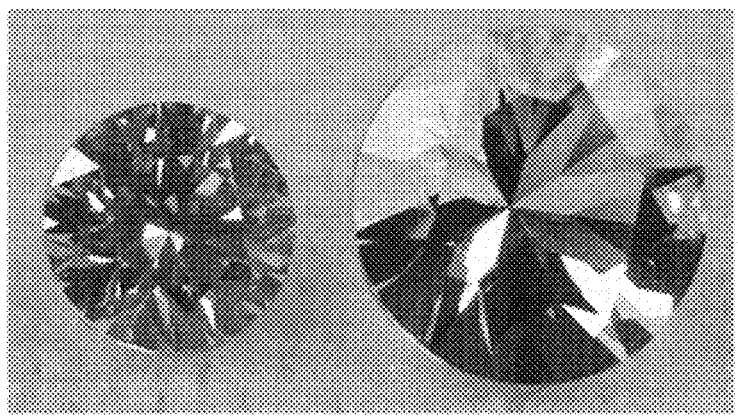
FIG. 1 is a plane photograph showing sample Nos. 3 and 9 in Examples.

A decorative glass article of the present invention contains: in mol %, 10% to 70% of $La_2O_3$, 10% to 90% of $Nb_2O_5$, 0% to 40% of $B_2O_3$, and 0% to 50% of $TiO_2$, wherein a refractive index is 2.0 or more and an Abbe number is 50 or less. The reason for limiting the glass composition in this way will be described below. In the following description of the content of each component, "%" means "mol %" unless otherwise specified.

$La_2O_3$ is a component that forms a network of a glass and is a component that increases the refractive index without lowering the transmittance. In addition, $La_2O_3$ also has an effect of improving weather resistance. The content of $La_2O_3$ is preferably 10% to 70%, 15% to 60%, and particularly preferably 20% to 50%. When the content of $La_2O_3$ is too small, it is difficult to obtain the above effects. On the other hand, when the content of $La_2O_3$ is too large, vitrification is difficult.

$Nb_2O_5$ is a component that has a large effect of increasing the refractive index, and is a component that reduces the Abbe number to increase the dispersion. $Nb_2O_5$ also has the effect of expanding the vitrification range. The content of $Nb_2O_5$ is preferably 10% to 90%, 30% to 85%, 40% to 80%, and particularly preferably 50% to 75%. When the content of $Nb_2O_5$ is too small, it is difficult to obtain the above effects. On the other hand, when the content of $Nb_2O_5$ is too large, vitrification is difficult.

From the viewpoint of obtaining optical properties such as a high refractive index and high dispersion, the content of $La_2O_3+Nb_2O_5$ is preferably 50% or more, 70% or more, and particularly preferably 90% or more. The content of $La_2O_3+Nb_2O_5$ may be 100%, and when other components are contained, may be 99.9% or less, 99% or less and particularly 95% or less.

$B_2O_3$ is a component that forms a network of a glass and expands the vitrification range. However, when the content of $B_2O_3$ is too large, the refractive index decreases, making it difficult to obtain desired optical properties. Therefore, the content of $B_2O_3$ is preferably 0% to 40%, 0.1% to 40%, 1% to 30%, 2% to 25%, and particularly preferably 3% to 20%. In addition, since a stable glass can be obtained, crystallization can be prevented even when a small amount of coloring component is added.

$TiO_2$ is a component that has a large effect of increasing the refractive index, and also has an effect of increasing chemical durability. In addition, $TiO_2$ also has an effect of reducing the Abbe number and increasing the dispersion. The content of $TiO_2$ is preferably 0% to 50%, 0.1% to 30%, 1% to 20%, and particularly preferably 3% to 15%. When the content of $TiO_2$ is too large, the absorption end shifts to the long wavelength side, so that the transmittance of visible light (particularly visible light in the short wavelength region) tends to decrease, and also vitrification is difficult.

The decorative glass article of the present invention may contain a coloring component such as a transition metal oxide excluding $Nb_2O_5$ and $TiO_2$ or a rare earth oxide excluding $La_2O_3$ in order to impart a desired color tone. Examples of the transition metal oxide include $Cr_2O_3$, $Mn_2O_3$, $Fe_2O_3$, CoO, NiO, CuO, $V_2O_5$, $MoO_3$, and $RuO_2$. Examples of the rare earth oxide include $CeO_2$, $Nd_2O_3$, $Eu_2O_3$, $Tb_2O_3$, $Dy_2O_3$, and $Er_2O_3$. These transition metal oxides or rare earth oxides may be used alone or in combination of two or more thereof. The content of these transition metal oxides or rare earth oxides (the total amount when two or more types are contained) is preferably more than 0% to 5%, 0.001% to 5%, 0.005% to 3%, 0.01% to 2%, and particularly preferably 0.02% to 1%. Depending on the components contained, the coloring may become too strong, the visible light transmittance may decrease, and the desired brilliance or fire may not be obtained. In this case, the content of the above transition metal oxide or rare earth oxide may be less than 1%, 0.5% or less, and 0.1% or less.

The decorative glass article of the present invention may contain, in addition to the above components, $SiO_2$, $Al_2O_3$, ZnO, MgO, CaO, SrO, and BaO each in a range of 10% or less in order to expand the vitrification range.

When the decorative glass article of the present invention positively contains components that expend the vitrification range, such as $La_2O_3$, $Nb_2O_5$, and $B_2O_3$, it is easy to prevent crystallization during glass production and to increase the size of the glass article (for example, for diameter, 2 mm or more, 3 mm or more, 4 mm or more, and particularly 5 mm or more).

When bismuth oxide ($Bi_2O_3$) is contained, the glass article tends to be overcolored and poor in fire. Therefore, the content of bismuth oxide in the decorative glass article of the present invention is preferably 30% or less, 20% or less, 10% or less, particularly preferably 1% or less in mol %, and most preferably bismuth oxide is substantially not contained. In addition, the decorative glass article of the present invention is preferably substantially free of lead oxide, which is harmful to the human body. In the present description, the expression "substantially free of" means not intentionally contained as a glass composition, and does not exclude an inclusion of unavoidable impurities. Objectively, it means that the content is less than 0.1% in mol %.

The decorative glass article of the present invention preferably has a refractive index (nd) of 2.0 or more, 2.05 or more, 2.1 or more, and particularly preferably 2.15 or more. Thus, the difference in refractive index between the inside and the outside (atmosphere) of the glass article is large, and light is easily reflected inside the glass article. As a result, it is easy to obtain sufficient brilliance as a decorative glass article. The upper limit of the refractive index is not particularly limited. When the upper limit thereof is too large, vitrification becomes unstable, so that the upper limit is preferably 2.5 or less, 2.4 or less, and particularly preferably 2.3 or less.

The decorative glass article of the present invention preferably has an Abbe number (vd) of 50 or less, 40 or less, 30 or less, and particularly preferably 25 or less. Thus, the glass article is highly dispersed, and fire is likely to exhibit. The lower limit of the Abbe number is not particularly limited. When the lower limit thereof is too small, vitrification becomes unstable, so that the lower limit is preferably 10 or more, and particularly preferably 13 or more.

The decorative glass article of the present invention preferably has a degree of coloring $\lambda_5$ of 395 or less, 390 or less, 380 or less, and particularly preferably 370 or less. Thus, visible light is easily transmitted, so that a colorless and transparent glass is easily obtained. In addition, the brilliance and the fire are easily increased.

The higher the density of the decorative glass article of the present invention, the more profound the appearance and the higher the luxury of the decorative glass article (particularly the jewelry glass article), which is thus preferred. Specifically, the density of the decorative glass article is preferably 3 $g/cm^3$ or more, 4 $g/cm^3$ or more, and particularly preferably 5 $g/cm^3$ or more.

The decorative glass article of the present invention can be used for decorative purposes such as jewelry, works of art, and tableware. For example, the decorative glass article of the present invention can be attached to decorations (jewelry) such as a ring, a pendant, an earring, or a bracelet as artificial jewels. The shape of the decorative glass article is not particularly limited, and examples thereof include a spherical shape, an elliptical shape, and a polyhedron.

The decorative glass article of the present invention is preferably subjected to chamfering such as so-called brilliant processing. Thus, light is easily reflected inside the glass article, and it is possible to enhance the brilliance, so that the decorative glass article of the present invention is particularly suitable as an artificial jewel.

EXAMPLES

Hereinafter, the decorative glass article of the present invention will be described in detail with reference to Examples, but the present invention is not limited to the following Examples.

Tables 1 shows Examples (Nos. 1 to 7) and Comparative Examples (Nos. 8 and 9) of the present invention.

TABLE 1

| Mol % | No. 1 | No. 2 | No. 3 | No. 4 | No. 5 | No. 6 | No. 7 | No. 8 | No. 9 |
|---|---|---|---|---|---|---|---|---|---|
| $SiO_2$ | | | | | | | | 61.6 | 69.4 |
| $B_2O_3$ | 15 | 15 | 10 | 5 | | | | 3 | 10.2 |
| $Bi_2O_3$ | | | | | | | | | |
| $Al_2O_3$ | | | | | | | | 2 | |
| $Na_2O$ | | | | | | | | 15 | 8.9 |
| $K_2O$ | | | | | | | | 1.5 | 8.5 |
| $CaO$ | | | | | | | | 4.5 | 2.8 |
| $ZnO$ | | | | | | | | 9 | |
| $TiO_2$ | | | | | | | 10 | 1.7 | |
| $ZrO_2$ | | | | | | | | 1.6 | |
| $La_2O_3$ | 25 | 30 | 30 | 30 | 30 | 40 | 30 | | |
| $Nb_2O_5$ | 60 | 55 | 60 | 65 | 70 | 60 | 60 | | |
| $Gd_2O_3$ | | | | | | | | | |
| $Ta_2O_5$ | | | | | | | | | |
| $Sb_2O_3$ | | | | | | | | 0.1 | 0.2 |
| $La_2O_3 + Nb_2O_5$ | 85 | 85 | 90 | 95 | 100 | 100 | 90 | 0 | 0 |
| Density [g/cm$^3$] | 5.25 | 5.24 | 5.33 | 5.36 | 5.47 | 5.72 | 5.47 | 2.73 | 2.52 |
| Refractive index nd | 2.20 | 2.19 | 2.22 | 2.22 | 2.26 | 2.22 | 2.26 | 1.56 | 1.52 |
| Abbe number vd | 20 | 20 | 20 | 21 | 20 | 21 | 21 | 45 | 64 |
| Degree of coloring $\lambda_5$ | 360 | 360 | 360 | 360 | 360 | 360 | 360 | 340 | 290 |
| Brilliance | A | A | A | A | A | A | A | D | D |
| Fire | A | A | A | A | A | A | A | C | D |
| Color tone | Colorless | Colorless | Colorless | Colorless | Colorless | Colorless | Colorless | Colorless | Colorless |

First, raw materials were mixed so as to have each glass composition shown in Table 1 to prepare a raw material batch. The obtained raw material batch was melted until homogeneous, and then rapidly cooled to obtain a glass sample (decorative glass article). The melting temperature was set to 1500° C. to 2000° C. for sample Nos. 1 to 7, and 1400° C. to 1500° C. for sample Nos. 8 and 9. The obtained glass sample was annealed near the glass transition temperature (350° C. to 700° C.), and then the density, the refractive index (nd), the Abbe number (vd), and the degree of coloring ($\lambda_5$) were measured and the appearance (brilliance, fire, color tone) was evaluated according to the following methods.

The density was measured by the Archimedes' method.

The right-angle polishing was performed on the glass sample and the refractive index (nd) and the Abbe number (vd) were measured by using KPR-2000 (manufactured by Shimadzu Corporation). The refractive index (nd) was evaluated by a measured value with respect to the d line (587.6 nm) of the helium lamp. The Abbe number (vd) was calculated according to the equation Abbe number (vd)={(nd−1)/(nF−nC)} using values of the refractive index of the d line and the refractive index of the F line (486.1 nm) and the C line (656.3 nm) of the hydrogen lamp.

For the degree of coloring ($\lambda_5$), the spectral transmittance was measured on a glass sample polished to a thickness of 10±0.1 mm, and a wavelength showing a transmittance of 5% in the obtained transmittance curve was adopted. The spectral transmittance was measured using V-670 manufactured by JASCO Corporation.

The appearance was evaluated as follows. First, brilliant processing was performed such that the plane shape of each sample had a size of about 5 mm to 7 mm in diameter. Next, the processed glass sample was visually evaluated for brilliance and fire under a fluorescent light source. The evaluation was performed in the following four stages. In addition, color tone evaluation was performed visually. Plane photographs of the sample Nos. 3 and 9 are shown in FIG. 1.

[Brilliance]

A: the sample looks brilliant and has strong brilliance.

B: the sample looks brilliant.

C: the sample looks a little brilliant.

D: the sample has almost no brilliance (similar to a glass window).

[Fire]

A: the sample shows iridescent (various colors) brilliance.

B: the sample shows iridescent brilliance, but the number of colors is small.

C: the sample has slight iridescent brilliance.

D: the sample has almost no iridescent brilliance.

As is clear from Table 1, sample Nos. 1 to 7 which are Examples have a $\lambda_5$ of 360, are colorless and transparent, has a high refractive index of 2.19 or more, and has a low Abbe number of 21 or less, so that the brilliance is strong and the fire is clearly observed. On the other hand, sample Nos. 8 and 9 which are Comparative Examples have a $\lambda_5$ of 340 or less and are colorless and transparent, but has a low refractive index of 1.56 or less and an Abbe number of 45 or more, so that almost no brilliance is felt, and the fire is hardly observed.

An experiment was conducted to confirm the difference in color tone when the coloring component was added. Specifically, a small amount of rare earth oxide, i.e., a coloring component, was added to the glass sample No. 3, to prepare sample Nos. 10 to 15. The results are shown in Table 2 and FIG. 2 (sample Nos. 10 to 13).

TABLE 2

| Mol % | No. 10 | No. 11 | No. 12 | No. 13 | No. 14 | No. 15 |
|---|---|---|---|---|---|---|
| $SiO_2$ | | | | | | |
| $B_2O_3$ | 9.9 | 9.9 | 9.9 | 9.9 | 10 | 10 |
| $Bi_2O_3$ | | | | | | |
| $Al_2O_3$ | | | | | | |
| $Na_2O$ | | | | | | |
| $K_2O$ | | | | | | |
| $CaO$ | | | | | | |
| $ZnO$ | | | | | | |
| $TiO_2$ | | | | | | |
| $ZrO_2$ | | | | | | |
| $La_2O_3$ | 29.9 | 29.9 | 29.9 | 29.9 | 30 | 30 |
| $Nb_2O_5$ | 59.7 | 59.7 | 59.7 | 59.7 | 60 | 60 |
| $Gd_2O_3$ | | | | | | |
| $Ta_2O_5$ | | | | | | |
| $Nd_2O_3$ | 0.5 | | | | | |

TABLE 2-continued

| Mol % | No. 10 | No. 11 | No. 12 | No. 13 | No. 14 | No. 15 |
|---|---|---|---|---|---|---|
| $CeO_2$ | | 0.5 | | | | |
| $Er_2O_3$ | | | 0.5 | | | |
| $Sm_2O_3$ | | | | 0.5 | | |
| $Cr_2O_3$ | | | | | 0.01 | |
| CoO | | | | | | 0.01 |
| $Sb_2O_3$ | | | | | | |
| $La_2O_3$ + $Nb_2O_5$ | 89.6 | 89.6 | 89.6 | 89.6 | 90 | 90 |
| Density [g/cm³] | 5.33 | 5.33 | 5.33 | 5.33 | 5.33 | 5.33 |
| Refractive index nd | 2.22 | 2.22 | 2.22 | 2.22 | 2.22 | 2.22 |
| Abbe number vd | 20 | 20 | 20 | 20 | 20 | 20 |
| Brilliance | A | A | A | A | A | A |
| Fire | A | A | A | A | A | A |
| Color tone | Blue | Orange | Pink | Light yellow | Blue | Yellow green |

Figure 2:
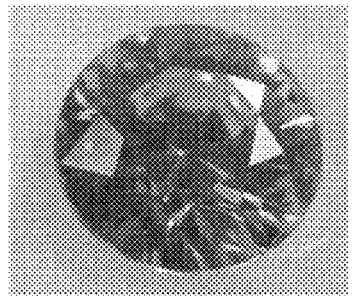
FIG. 2 is a plane photograph showing sample Nos. 11 to 14 in Examples.
Figure 2:
Figure 2:
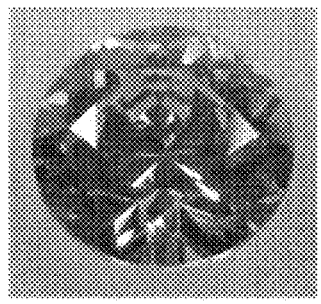
Figure 2:
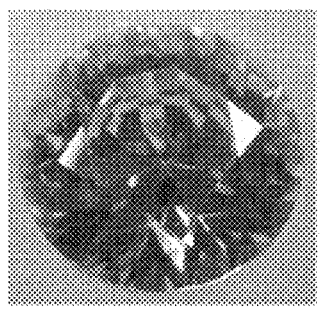

As shown in Table 2 and FIG. 2, it can be seen that glass articles having various colors can be obtained depending on the coloring component contained, and are suitable for decorations (particularly jewelry).

The invention claimed is:

1. A decorative glass article comprising: in mol %,
10% to 30% of $La_2O_3$,
50% to 85% of $Nb_2O_5$,
0.1% to 40% of $B_2O_3$, and
0% to 30% of $TiO_2$,
wherein a refractive index is 2.0 or more and an Abbe number is 50 or less.

2. The decorative glass article according to claim 1, further comprising: in mol %, 0.1% to 10% of $B_2O_3$.

3. The decorative glass article according to claim 1, further comprising: at least one selected from a transition metal oxide excluding $Nb_2O_5$ and $TiO_2$ and a rare earth oxide excluding $La_2O_3$ in an amount of more than 0% to 5% in mol % in aggregate.

4. The decorative glass article according to claim 1, further comprising: in mol %, 10% or less of $Bi_2O_3$.

5. The decorative glass article according to claim 1, further comprising: in mol %, 70% or more of $La_2O_3$+ $Nb_2O_5$.

6. The decorative glass article according to claim 1, which has a degree of coloring $\lambda_5$ of 395 nm or less.

7. The decorative glass article according to claim 1, wherein the Abbe number is 20 or less.

8. The decorative glass article according to claim 1, wherein the refractive index is 2.19 or more.

9. The decorative glass article according to claim 1, which has a density of 5 g/cm³ or more.

10. The decorative glass article according to claim 1, which is subjected to chamfering.

11. The decorative glass article according to claim 1, which is an artificial jewel.

12. A decoration comprising: the decorative glass article according to claim 1.

* * * * *